(12) United States Patent
Mayer

(10) Patent No.: US 8,352,703 B2
(45) Date of Patent: Jan. 8, 2013

(54) ADDRESS MAPPING OF PROGRAM CODE AND DATA IN MEMORY

(75) Inventor: Albrecht Mayer, Deisenhofen (DE)

(73) Assignee: Infineon Technologies AG, Neubiberg (DE)

( * ) Notice: Subject to any disclaimer, the term of this patent is extended or adjusted under 35 U.S.C. 154(b) by 701 days.

(21) Appl. No.: 12/034,270

(22) Filed: Feb. 20, 2008

(65) Prior Publication Data

US 2009/0210638 A1  Aug. 20, 2009

(51) Int. Cl.
*G06F 12/00* (2006.01)

(52) U.S. Cl. ... 711/202; 711/203; 711/215; 711/12.086; 711/12.017; 711/12.087

(58) Field of Classification Search ........... 711/E12.083, 711/202, 203, 215, E12.086, E12.087, E12.017; 712/210, 212; 717/153
See application file for complete search history.

(56) References Cited

U.S. PATENT DOCUMENTS

| | | | | |
|---|---|---|---|---|
| 6,002,875 | A * | 12/1999 | Stolberg | 717/153 |
| 6,658,553 | B1 * | 12/2003 | Ding et al. | 712/210 |
| 2005/0183072 | A1 | 8/2005 | Horning et al. | |
| 2007/0006172 | A1 | 1/2007 | Swoboda et al. | |
| 2010/0223423 | A1 * | 9/2010 | Sinclair et al. | 711/103 |

OTHER PUBLICATIONS

R.J. Pankhurst; "Program Overlay Techniques"; Communications of the ACM, vol. 11, No. 2, Feb. 1968, p. 119-125.

* cited by examiner

*Primary Examiner* — Pierre-Michel Bataille
(74) *Attorney, Agent, or Firm* — Dickstein Shapiro LLP

(57) ABSTRACT

A system for mapping information addresses in a memory. The system includes a memory wherein each byte is mapped to a plurality of unique addresses and a microprocessor for assigning at least one of the unique addresses to the information. The information can be program code fragments and/or data. Also disclosed is a method for mapping information addresses in a memory utilizing such a system. The method includes mapping each byte of memory into a plurality of unique addresses and assigning at least one of the unique addresses to the information.

27 Claims, 3 Drawing Sheets

RAM 5 KB

Physical Memory RAM 5 KB

I 2 KB    II 2 KB    III 5KB    IV 1KB

Code Modules 16 x 5 KB

Address Room of Unique Addresses

RAM
5 KB

Physical Memory RAM 5 KB

| I | II | III | IV |
|---|---|---|---|
| 2 KB | 2 KB | 5KB | 1KB |

Code Modules 16 x 5 KB

Address Room of Unique Addresses

ADDRESS MAPPING OF PROGRAM CODE AND DATA IN MEMORY

FIELD OF THE INVENTION

The present invention relates generally to debugging user programs executed by a processor.

BACKGROUND OF THE INVENTION

A RAM can hold information including multiple pieces of program code or data fragments. Typically each byte of RAM is accessible using a unique address. During program execution, one or different code fragments can be stored in the same RAM location. Which code fragment is currently present might be determined by the program itself or depend on some other condition. While debugging the program, breakpoints can be set in the code. A breakpoint is an intentional stopping, pausing place, or interruption in a program, to aid in debugging the program. During the pause, after a breakpoint is reached, a programmer can inspect the test environment (logs, memory, files, etc.) to determine whether the program is functioning as expected. When a breakpoint is set at a certain address in the RAM, once that breakpoint is reached, one does not know necessarily what program code just executed if more than one code fragment can be sharing the same RAM address. A program is held in RAM can be exchanged dynamically by an operating system memory management unit (MMU) or explicitly by a user program. For this purpose the microprocessor can be provided with an internal scratch pad RAM.

Typically a breakpoint logic is implemented as a comparator, working on a fetch address emitted by the processor. If the fetch address is not unique in the context considered here, a link to the currently executed code fragment is missing and false triggers may occur that must be ignored. This problem exists both for physical and virtual addresses. This affects the runtime behavior up to the first "real" breakpoint.

One solution for dealing with this problem is to halt the system and read the program RAM content. However, this solution is not applicable if the target cannot be stopped or the RAM content is swapped repeatedly. Furthermore, it's inefficient for analyzing longer traces.

Another solution is to track RAM loading. That is accomplished by tracing or remembering the content of a specific "marker" location. This approach fails when the number of RAM fragments written independently ("heap" of modern operating system) grows or when the marker location cannot be forced to be served by the tool chain (e.g., compiler, linker, locator, loader, etc.). Additionally, this method requires extra logic and synchronization to track the loading if it is not done by the processor itself but, for example, by a DMA controller.

SUMMARY OF THE INVENTION

A system for mapping information addresses in memory is provided. The system includes a memory wherein each byte is accessible over a plurality of different addresses and a microprocessor for assigning at least one of the addresses to information. The information can be program code fragments and/or data. Also disclosed is a method for mapping information addresses in a memory utilizing such a system. The method includes mapping the same physical memory into a plurality of unique addresses and assigning at least one of the unique addresses to the information.

The method includes loading the information into the memory utilizing software configured to exchange the information in the memory as it is needed by a program. Information that will be reused is retained in memory and each address range represents a distinct program code or data fragment. The disclosed method creates a one-to-one relationship between the program code fragment and its address range.

These and further objectives, features and advantages of the present invention will become more apparent from the following description when taken in connection with the accompanying drawings which show, for purposes of illustration only, an embodiment in accordance with the present invention.

BRIEF DESCRIPTION OF THE DRAWINGS

FIGS. 2 and 3 illustrate an exemplary address mapping scheme in accordance with an embodiment of the present invention.

DETAILED DESCRIPTION OF PREFERRED EMBODIMENT OF THE INVENTION

By way of overview, the present invention provides for the efficient use of RAM by operating systems and programs to increase efficiency in debugging program code. One particular application of the present invention is for tracing program flow during debugging. Provided is a system and method for writing program code or data in RAM so as to make for more efficient retrieval of such information during debugging and testing applications. Debugging, program, and data tracing can be conducted faster and more efficiently using unambiguous retrieval because the critical code or data can be identified immediately. Use of the term information is meant to pertain to both program code and data fragments.

Figure 1:
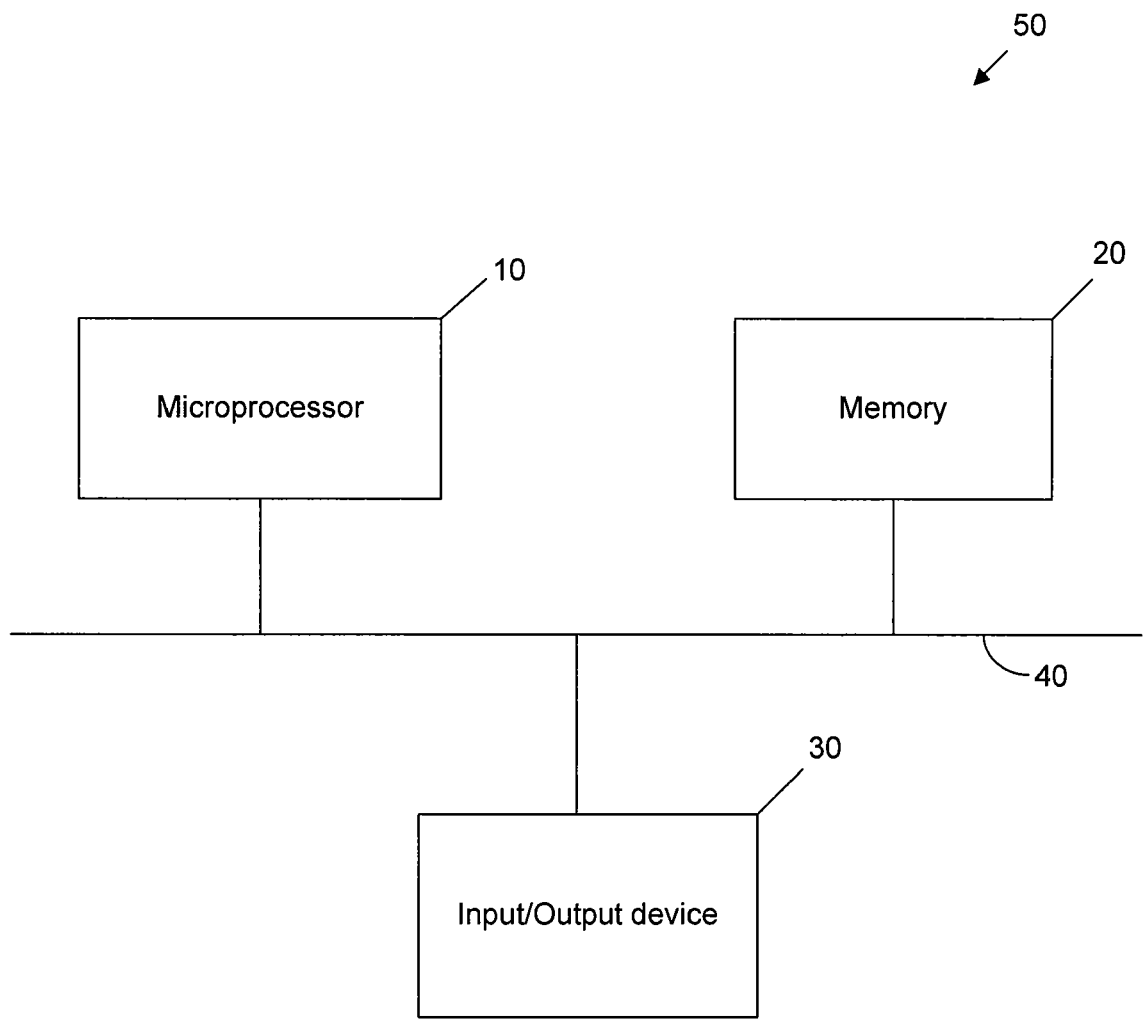
FIG. 1 is a system embodying the present invention.

FIG. 1 shows an exemplary system 50 for mapping program code addresses in memory. Memory 20 is a recording medium that retains digital data used for computing for some interval of time. Memory 20 is preferably random access memory (RAM) but can be any type of memory, and can take the form of integrated circuits that allow stored data to be accessed in any order. Each byte in memory 20 is mapped to a plurality of unique addresses. The term byte in this description is used as general term for the minimum addressable unit or memory location in memory 20. Usually the minimum addressable unit is one byte comprising eight bits.

Microprocessor 10 is a programmable digital electronic component. Microprocessor 10 assigns each of the addresses to a program code fragment. Input/Output (I/O) device 30 is any device used to enter information and instructions into a computer for storage in memory 20 or processing by microprocessor 10. I/O device 30 also delivers processed data to a human operator or a machine controlled by microprocessor 10. Microprocessor 10, memory 20 and I/O device 30 are connected by a system bus 40.

System 50 is capable of mapping information addresses in memory 20. Each byte of memory 20 is mapped to a plurality of unique addresses. Microprocessor 10 assigns each of the addresses to information. Thus, the number of addresses addressable by microprocessor 10 is higher than the number of bytes in memory 20. The addresses addressable by microprocessor 10 are the fetch addresses used to access the different bytes of the information in memory 20. Since each byte of memory 20 is mapped to a plurality of unique fetch addresses microprocessor 10 can access one specific byte with at least two fetch addresses. This can be achieved very easily by ignoring higher address bits.

System 50 includes computer software (not shown) configured to load the program code fragments into memory 20. The software is further configured to exchange program code fragments in memory 20 as they are needed by a program. Memory 20 can retain program code fragments that will be reused and each address range represents a distinct program code fragment. Those of skill in the art should realize that while microprocessor 10 is indicated as assigning each of the addresses to information, it could also be configured such that it assigns the information to one of the addresses.

FIGS. 2 and 3, discussed below, are used to describe an embodiment of the present invention by way of illustration only and should not be construed in any way to limit the scope of the invention. Certain details regarding memory addressing and program code and data fragments described herein have been omitted as they are beyond the scope of the present invention. In accordance with the present invention, information is stored in memory. This information can be in the form of program code or data fragments and it is to be understood that any reference to the storing of information herein is applicable to either program code or data fragments.

In accordance with a preferred embodiment of the present invention, each byte of RAM is mapped to different addresses such that there are multiple unique addresses for each byte. The physical RAM is mapped to more than one location, each with its own address range, preferably fewer than 100 locations. Thus, a unique address can be assigned for each memory location in conjunction with specific information. The specific information can be for example the higher address bits ignored for accessing the bytes of memory 20. These higher address bits are then the specific information that for example can represent the type of code or data fragment stored in memory 20. The address bits of such a unique fetch address emitted by microprocessor 10 can be separated in a lower part for accessing the bytes in memory 20 and a higher part representing the different base addresses under which the bytes in memory 20 are accessible. The lower part of the address bits can cover the address room for the available bytes in memory 20 and the higher part of the address bits can represent a location range. The range of bytes of memory 20 appears multiple times in different address ranges in the address room of the unique addresses. The different address ranges are determined by the higher part of the address bits and can be called location ranges.

Using such unique addresses, it is easier to identify what code or data fragment is stored within the RAM. In accordance with an embodiment of the invention, the byte is mapped to different unique addresses. A code fragment is assigned a location range, which is a part of the unique address of the byte of RAM where the code fragment is stored. Instead of having just a single address for each byte of RAM, the address of the byte of RAM together with the location range where the code is stored becomes a unique address. Thus, a byte of RAM can have a plurality of unique addresses and each stored code fragment has a specific range of single unique addresses. Each unique address refers unambiguously to a specific byte in memory 20 and to the specific code fragment stored in memory 20.

When a breakpoint is set at an address, the code that just executed can be easily identified because only one piece of code is assigned to that unique address.

A software component is configured to recognize the code fragments and load the code fragments into the RAM. From the software side, more unique addresses have been created and the physical RAM will appear larger meaning that the logical address room of the unique addresses is larger than the physical address room memory 20. With reference to FIG. 2, the physical RAM is 5 KB and there are four pieces of code that are to be loaded into the RAM. The total size of all four pieces of code is bigger than the space of 5 KB available in the physical RAM. Depending on their size the different pieces of code have to be loaded sequentially. If the first two code fragments I, II are 2 KB each, the third III is 5 KB and the fourth IV is 1 KB, the fourth IV has to be loaded alone into this physical RAM and the other fragments can be loaded at once into the RAM. In the following it is assumed that all four fragments are loaded alone into the RAM one at a time.

The physical RAM is accessible through unique addresses emitted by microprocessor 10 as fetch addresses. The unique addresses, however, additionally to the address bits necessary to address each byte in the 5 KB of RAM contain four further address bits which are used to determine the fragment actually loaded into the RAM. These additional four address bits are not used to address the RAM. The logical address room of unique addresses is 16×5 KB. The 5 KB of the physical RAM appear sixteen times with sixteen different base addresses in the logical address room of unique addresses and each byte of the RAM is assigned to 16 different unique addresses each lo. Accordingly each byte of each code fragment has a unique address. However, for execution the corresponding code fragment has to be loaded into RAM. The code fragments can be hold in a further storing device from where they are loaded into the RAM for execution.

The unique addresses are used for the breakpoint logic in order to assure that a breakpoint only occurs in the observed code fragment. If the breakpoint logic comprises a comparator for comparing the fetch address emitted by microprocessor 10 with breakpoint addresses the entire unique address is used for this comparison whereas only a part of the unique address is used for addressing RAM. In the present embodiment the highest four address bits are only used for the breakpoint logic.

The above described embodiment can be equally applied to data fragments. Programs manipulate and store data while they are running, and the present invention can be used to trace data in the same manner that it is used to trace program code. The above described approach is applicable when data structures are dynamically loaded into hardware. By using software to load the data into the RAM, the program flow can be observed and the data side can be debugged and traced.

The software process that loads data is slightly different than the process that loads program code fragments. The same data can be used at different points during program execution and can be manipulated and changed throughout program execution. Thus, additional logic is necessary within the software to designate where the data should be located for maximum performance. However, the mechanism for storing data is unchanged.

In accordance with one embodiment of the present invention, the software can exchange code fragments and data in the RAM as they are needed by a program. The software loads fragments logically and exchanges program code fragments or data in and out of the RAM, while maintaining the unique addresses of the various code fragments and data.

With reference to FIG. 3, during execution, the software may exchange a code fragment or pieces of data that are 2 KB in size with two code fragments or pieces of data that are 1 KB each in size. While the original code piece had an address based on the 0-2 range, the first new code piece has an address of 0-1 and the second new code piece has an address of 1-2. Thus, the unique addresses for a code piece can change dynamically based upon the position where the data or code fragment is loaded by the software. The hardware and the RAM can both be configured to support this dynamic change in addresses. The same applies if for other reasons a code fragment is loaded into the RAM at a position not at the beginning of the RAM. If in such cases the location of a code or data fragment within the RAM can vary provision has to be made that the unique addresses emitted by microprocessor 10 have to be translated into addresses suitable for accessing the RAM at the correct position.

If a code fragment or data will be needed at some point in the future, it is possible not to exchange it but to keep it in the RAM. In other words, code fragment or data that will be needed again are retained for future use in RAM while others are exchanged out.

Each code fragment is mapped to a unique address. Software is responsible for verifying the code is loaded into these addresses. This makes it possible to identify, during tracing, the code executed or data used right before a breakpoint based on the code's location in the RAM. Thus, there is a unique address for each code fragment and piece of data.

Figure 4:
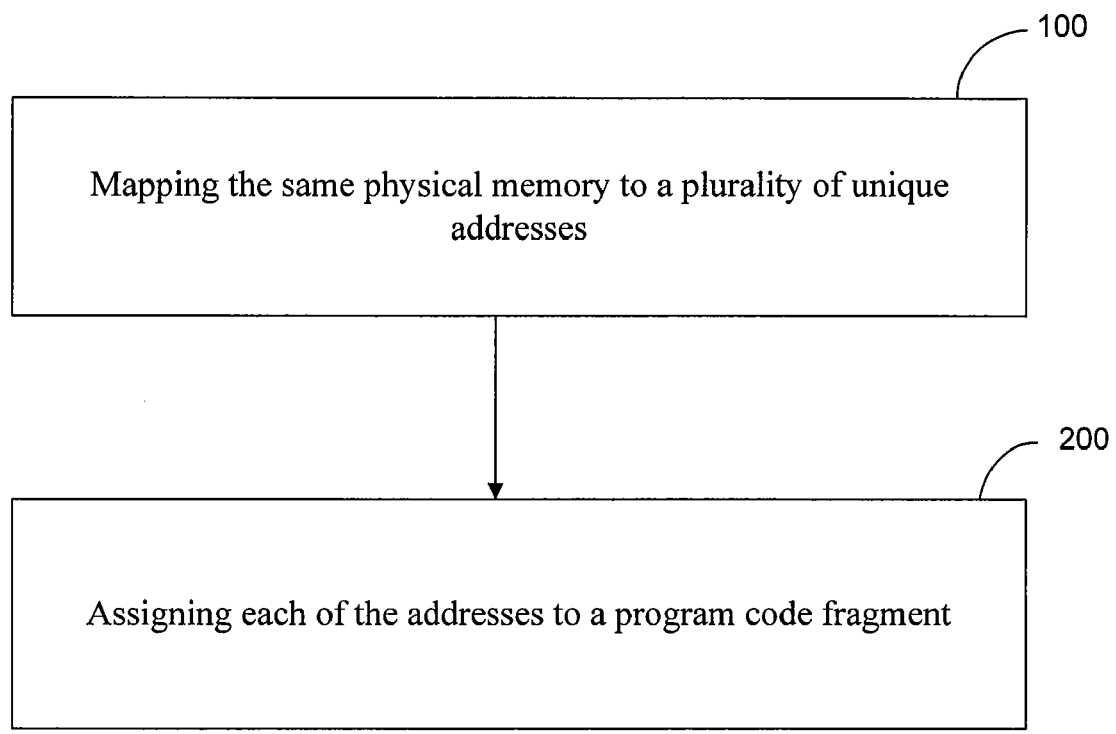
FIG. 4 is a method for mapping information addresses in memory.

FIG. 4 illustrates the steps for mapping information addresses in memory in accordance with an embodiment of the present invention. In step 100, the same physical memory is mapped to a plurality of unique addresses. Then, at step 200, each of the addresses is assigned to a program code or data fragment. Alternatively, at step 200, a program code or data fragment can be assigned to an address range.

The single physical memory (RAM) where the unique program codes are stored is mapped into the address space with many different base addresses. Higher address bits that do not coordinate with unique code fragments or data are ignored. The unique program codes can then be moved to this memory with different base addresses. Accordingly, there is a one-to-one relationship between a specific program code fragment and its address. This arrangement fulfills the requirement for unambiguous trace and triggering.

In one embodiment, RAM is used to store a plurality of dynamically loaded program codes in parallel. The user/tooling just needs to make sure that there is no address overlap. This is not different from the case where the RAM is mapped into the address space at only one base address. If the RAM is accessible under 16 different base addresses under the present invention, 4 higher address lines are ignored. Those of skill in the art will realize that an MMU does the exact opposite. In the case of an MMU, different code can have the same address from the point of view of the software and the hardware.

The one-to-one relationship between a specific code fragment or data and its address makes it easy to find sections of program code or data in RAM without requiring a marker or a full scan. Unlike traditional MMU's, different programs can not use the same local addresses.

The present invention creates a virtual memory of unique addresses with more base addresses and stores the information in an un-ambiguous manner (one-to-one), fewer bits are needed to describe the location within the physical RAM. The location in RAM where the program code or data resides is limited based on the above described mapping of the base address. Thus, since the possible location is smaller, you need fewer bits to describe it.

The above described embodiment of the present invention is backward compatible as long as the additional addresses for the same physical RAM are not used up.

One skilled in the art will appreciate that additional variations may be made in the above-described embodiment of the present invention without departing from the spirit and scope of the invention which is defined by the claims which follow.

The invention can also be embodied in a system comprising a microprocessor, a breakpoint logic, a memory interface and a address bus coupled to the microprocessor, the breakpoint logic and the memory interface, wherein the address bus is configured to transmit addresses emitted by the microprocessor with high width to the breakpoint logic and with a reduced width to the memory interface. The width of the addresses may be the number of address bits such that more address bits of the addresses are provided to the breakpoint logic than to the memory interface. The address transmitted to the memory interface serve for addressing a connected memory holding code or data fragments. In particular the address bus can be configured to transmit addresses emitted by the microprocessor with high width to the breakpoint logic and with a reduced width to the memory interface.

What is claimed is:

1. A memory mapping system comprising:
    a memory having physical memory locations, wherein at least one of the physical memory locations is mapped to a plurality of unique addresses; and
    a microprocessor configured to assign a plurality of information fragments to the plurality of unique addresses, respectively.

2. The system of claim 1 wherein an information fragment comprises a program code fragment.

3. The system of claim 2 further comprising software configured to load program code fragments into the memory as they are needed by a program.

4. The system of claim 2 wherein the memory is configured to retain program code fragments that will be reused.

5. The system of claim 2 wherein each unique address range represents a distinct program code fragment.

6. The system of claim 1 wherein the memory is divided into a plurality of unique addresses, such that there is a unique address for each of the physical memory locations.

7. The system of claim 1 wherein the memory is a random access memory.

8. The system of claim 1 wherein an information fragment comprises a data fragment.

9. The system of claim 8 further comprising software configured to load the data fragment into the memory as it is needed by a program.

10. The system of claim 8 wherein each unique address range represents a distinct data fragment.

11. The memory mapping system of claim 1 further comprising a breakpoint address comparator configured to identify an exact location of a breakpoint using the assigned physical address of one of the plurality of information fragments.

12. A system for mapping information addresses in memory comprising:
    a memory having physical memory locations, wherein at least one of the physical memory locations is mapped to a plurality of unique addresses; and
    a microprocessor configured to assign a plurality of information fragments to the plurality of unique addresses, respectively.

13. A method for mapping information addresses in a memory comprising:
    mapping at least one physical memory location of the memory to a plurality of unique information addresses; and
    assigning the plurality of unique information addresses to a plurality of information fragments, respectively.

14. The method of claim 13 further comprising loading the information fragments into the memory, wherein the loading step utilizes software configured to exchange the information fragments in the memory as needed by a program.

15. The method of claim 13 wherein an information fragment comprises a program code fragment.

16. The method of claim 15 wherein at least one unique address range represents a distinct program code fragment.

17. The method of claim 15 further comprising creating a one-to-one relationship between the program code fragment and its unique address range.

18. The method of claim 13 wherein an information fragment comprises data.

19. The method of claim 18 wherein each unique address range represents distinct data.

20. The method of claim 18 further comprising creating a one-to-one relationship between the data and its unique address range.

21. The method of claim 13 further comprising retaining information fragments that will be reused.

22. The method of claim 13 wherein the memory is divided into a plurality of unique addresses, such that there is a unique address for each physical memory location of the memory.

23. The method of claim 13 wherein there are 16 unique addresses in the at least one physical memory location.

24. The method of claim 13 wherein the memory is a random access memory.

25. The method of claim 13 further comprising identifying an exact location of a breakpoint using the assigned physical address of one of the plurality of information fragments.

26. A method for identifying program code in a memory comprising:
   providing a unique address representing a program code fragment, wherein the unique address comprises a first portion and a second portion;
   addressing the program code fragment in the memory using the first portion of the unique address; and
   identifying an exact location of a breakpoint using both the first portion and the second portion of the unique address.

27. A method for mapping information addresses in a memory comprising:
   mapping at least one memory location of the memory to a plurality of unique addresses; and
   assigning a plurality of information fragments to the plurality of unique addresses, respectively.

* * * * *